US005650072A

United States Patent [19]

Mc Clain et al.

[11] Patent Number: 5,650,072
[45] Date of Patent: Jul. 22, 1997

[54] SULFONATE AND SULFATE DISPERSANTS FOR THE CHEMICAL PROCESSING INDUSTRY

[75] Inventors: Robert D. Mc Clain, Sugar Land; Vincent E. Lewis, Missouri City, both of Tex.

[73] Assignee: Nalco/Exxon Energy Chemicals L.P., Sugarland, Tex.

[21] Appl. No.: 635,118

[22] Filed: Apr. 19, 1996

Related U.S. Application Data

[60] Division of Ser. No. 428,587, Apr. 25, 1995, which is a continuation-in-part of Ser. No. 238,035, Apr. 22, 1994, abandoned.

[51] Int. Cl.[6] .................................................... C02F 5/10
[52] U.S. Cl. ..................... 210/698; 208/48 AA; 203/8; 203/DIG. 3; 252/180; 585/950; 558/463
[58] Field of Search .................... 208/48 AA, 48 Q; 203/6, 8, 9, DIG. 3; 210/698–701; 252/180; 585/950; 558/463

[56] References Cited

U.S. PATENT DOCUMENTS

| 3,140,915 | 7/1964 | Axelrad et al. | 210/698 |
| 4,184,887 | 1/1980 | Lange et al. | 106/111 |
| 4,559,149 | 12/1985 | Shell | 166/299 |
| 4,902,824 | 2/1990 | Syrinek | 560/248 |
| 5,427,690 | 6/1995 | Rowe et al. | 210/698 |

*Primary Examiner*—Peter A. Hruskoci
*Attorney, Agent, or Firm*—Robert A. Miller; James J. Drake

[57] ABSTRACT

The invention provides a method for the inhibition of fouling in petrochemical processes. The method comprises adding from about 0.1 to about 10,000 parts per million sulfonated oils, sulfonated fatty acids, sulfated oils, sulfated fatty acids, or naphthalene sulfonate formaldehyde condensates to a petrochemical process to disperse water insoluble foulant into an aqueous system.

3 Claims, No Drawings

SULFONATE AND SULFATE DISPERSANTS FOR THE CHEMICAL PROCESSING INDUSTRY

REFERENCE TO RELATED PATENT

The present application is a division of application Ser. No. 08/428,587, filed Apr. 25, 1995 which is a continuation-in-part of application Serial No. 08/238,035 filed Apr. 22, 1994, now abandoned, by Robert D. McClain entitled "Antifoulant for Acrylonitrile Processing", the disclosure of which is incorporated herein by reference.

BACKGROUND OF THE INVENTION

1. Field of the Invention

The addition of certain sulfated and sulfonated materials to the aqueous streams of a multiplicity of units in the chemical processing industry will inhibit the fouling of process hardware. These materials work by dispersing the foulant material in the stream and preventing deposition of the foulant throughout the system. The usefulness of this invention is illustrated by its application in ethylene plant caustic systems, styrene monomer production, acrylonitrile recovery systems, and the terephthalic acid purification process.

2. Description of the Prior Art

In ethylene plants, hydrocarbon feedstocks are thermally cracked with steam to produce ethylene. Other hydrocarbon species are also produced along with less desirable impurities. Among these impurities are carbon dioxide and hydrogen sulfide; the so-called acid gases. These are removed from the cracked gas stream in a caustic scrubbing tower. Water soluble salts, $Na_2CO_3$ and $Na_2S$, are formed and are removed in a water separator.

Another by-product produced in the cracking furnace is acetaldehyde. It arises from partial oxidation of ethylene. Due to its physical properties, acetaldehyde is carried with the cracked gas stream to the caustic scrubber tower. In this tower, acetaldehyde reacts with sodium hydroxide (caustic) to produce a homopolymer. This polymer is formed by self-condensation of acetaldehyde via the Aldol reaction. As the polymer grows, it becomes progressively less and less soluble in caustic. It eventually precipitates from solution and coats trays and other tower internal surfaces. Eventually, scrubbing efficiency is lost and the tower must be shut down and cleaned.

One method of dealing with this problem is described in U.S. Pat. No. 5,160,425. This patent discloses use of carbohydrazide to derivatize acetaldehyde. This derivative will no longer react with caustic, and hence polymerization is stopped. Other compounds have been disclosed for this purpose as well. These are ethylenediamine, hydroxylamine salts and ethyl acetoacetate. Each of these compounds must be used in a stoichiometric ratio to the amount of acetaldehyde present. This is a costly method, however, and other more cost effective ways of treating this problem are continually being sought.

Lignosulfonates have been used for over 25 years to disperse polymer of this nature into caustic systems. The exact structure of lignin is not known, but the basic subunit of the polymeric structure is phenylpropane. The water soluble derivative, lignosulfonate helps prevent fouling by inhibiting deposition of the homopolymer onto process hardware. We have discovered that other, water-soluble dispersants will disperse polymeric acetaldehyde in caustic. Since it was not previously known that these materials would perform as dispersants for this system, the present invention represents a novel technology for this application.

A process used to purify terephthalic acid is described in volume 17 of the Encyclopedia of Chemical Technology. In this process, crude terephthalic acid is mixed with water to form a slurry. This slurry is passed through a heat exchanger and into a vessel called a dissolver. In the dissolver, the slurry is heated to a temperature greater than 250° C. under enough pressure to keep water in the liquid phase. Under these conditions, terephthalic acid and its impurities are soluble in water.

In practice, this process leads to fouling of the preheat exchanger. Deposit analyses of samples from the exchanger indicate that the foulant is terephthalic acid. This means that a small amount of product is not being held in the slurry and is simply being deposited on the heat exchanger.

This problem is not successfully treated at this time. Even though terephthalic acid is an organic compound and not normally soluble in aqueous systems, it exists as an aqueous slurry until it reaches the dissolver. Therefore, any treatment must consist of a method of keeping terephthalic acid suspended in water. Thus, the addition of a water-soluble additive, capable of dispersing organic material into water, would be useful for the terephthalic acid process.

In a styrene manufacturing process, ethylbenzene and steam are fed into a reactor. Ethylbenzene is dehydrogenated to form styrene in a catalytic process. The temperature is very high, reaching temperatures in excess of 550° C. From the reactor, crude styrene (containing unreacted ethylbenzene, steam and polymer) is cooled by a series of heat exchangers and enters an accumulator where condensed water and hydrocarbon are separated. Hydrocarbons flow out the top of this separator and are sent to the recovery section. Water flows out the bottom of this vessel and is sent to a hydrocarbon stripping tower where residual crude styrene is sent back to the separator. Water exits the bottom of this tower and is convened to steam for use in the reactor.

In the heat exchanger system, the condensation patterns are such that polymer precipitates from the gas stream first. It comes in contact with the exchanger walls and adheres to them. Water is next to condense followed by crude styrene. Thus, crude styrene is unable to redissolve precipitated polymer in this system because of the aqueous interface, leading to fouling on the heat exchangers.

This application is currently treated with an antioxidant. It is injected at the high temperature end of the heat exchanger train to help control formation of the polymer. However, some polymer is still formed. Addition of a dispersant would help move this polymer from the exchanger surface to the hydrocarbon layer and greatly improve operation of this unit.

In one method for the manufacture of acrylonitrile, gaseous reactants from the gas phase ammoxidation of propylene are cooled from an initial temperature of about 400°–510° C. and are passed countercurrent to an aqueous stream of acid such as sulfuric acid, to neutralize and recover any ammonia present such as disclosed in U.S. Pat. No. 3,404,947 and U.S. Pat. No. 3,408,157. The resultant gases which contain major amounts of nitrogen and acrylonitrile and minor amounts of hydrogen cyanide, acetonitrile, carbon dioxide, carbon monoxide, propylene, ammonia, water, oxygen, acrolein and certain other carboxylic acids, aldehydes, and nitriles, are contacted with water at a temperature of 1°–40° C. to form a solution containing less than about 10 percent by weight acrylonitrile. The acrylonitrile (along with some water and hydrogen cyanide) is separated from any acetonitrile present by distillation and recovered overhead. Volatiles are separated from the resultant aqueous stream in a stripper. The bottoms from the stripper contain approximately 1 percent organic material as well as water-soluble polymers such as polyacrylic acid and its salts. These materials foul the surfaces of heat exchangers in the system, resulting in decreased production efficiencies. No technologies are currently practiced to alleviate this problem. The addition of an additive to disperse foulant material in the process would greatly improve the production of acrylonitrile by extending the time between cleanings of heat exchangers.

SUMMARY OF THE INVENTION

Materials of the invention include derivatives of oils and fatty acids from various natural origins (plant and animal sources). The oils are mostly comprised of acids that are primarily oleic ($C_{18}$, monounsaturate) and linoleic ($C_{18}$, polyunsaturate) acids but also include acids with carbon lengths of $C_{16}$ to $C_{22}$. It is shown by example that sulfated oils and sulfonated oils both work very effectively. It is also demonstrated that single component derivatives (i.e. sulfonated oleic acid) are also effective dispersants. Many other sulfur derivatized oils and fatty acids perform in a like manner, including carboxylic acids of different chain lengths and acids from a wide range of animal fats, fish oils, vegetable oils. These acids further include related fatty acids like ricinoleic acid ($C_{18}$, monounsaturate) and erucic acid ($C_{22}$, monounsaturate).

Also included in this invention are materials that are neutralized, polymeric condensation products of naphthalene sulfonic acid and formaldehyde. These naphthalene sulfonate formaldehyde condensates may extend from a molecular weight of about X to about Y. The naphthalene portion may be sulfonated in either the 1 or 2 position. Methylene linkages typically connect the sulfonated naphthalene rings at positions 5 or 8. The polymers may be neutralized with a variety of bases or mixture of bases including sodium, potassium, calcium, and ammonium hydroxide. The general structure of the naphthalene sulfonate formaldehyde condensate is $—CH_2[C_{10}H_5(SO_3M)]_n—$, where M may be $Na^+$, $K^+$, $Ca^{+2}$, $NH_4^+$, or the like Since it was previously unknown that these materials would behave as antifoulants for petrochemical processes, this invention reveals novel technology for such applications. The invention is extremely cost effective and provides the chemical producer an opportunity to run a more economic process. The use of this invention also allows for increased heat transfer efficiency, longer run times, and safer operations.

DESCRIPTION OF THE PREFERRED EMBODIMENT

A method for preventing foulant deposition in petrochemical processes that produce water-insoluble foulant materials is disclosed. The method comprises dispersing the water-insoluble foulant into an aqueous system, wherein the aqueous system includes from about 0.1 to 10,000 parts per million sulfonated or sulfated fatty acid. The fatty acid is selected from the group consisting of tall oils, fish oils, animal fats, vegetable oils, synthetic oils, tall oil fatty acid, castor oil, rapeseed oil, soybean oil, oleic acid and linoleic acid.

In the preferred method, the sulfonated tall oil fatty acids have a carbon length range of from about 16 to about 20 carbons. Preferably, the sulfonated fatty acids are included in the aqueous system in a concentration of from about 0.1 to about 1,000 parts per million.

Preferably, the aqueous system of the invention is chosen from among caustic, quench water, wash water, extraction solvent, hydrocarbon steam condensate and terephthalic acid dissolver. Where the aqueous system is an extraction solvent, the extraction solvent may be selected from a number of such solvents including acrylonitrile extraction solvent, butadiene extraction solvent, isoprene extraction solvent and aromatics extraction solvent. Alternatively, the extraction solvent may be selected from water, water/acetonitrile, 1-methyl-2-pyrrolidinone/water, dimethylformamide/2furaldehyde/water, 3-methoxypropionitrile/2-furaldehyde/water, glycols, and sulfolane.

Further disclosed is a method for preparing acrylonitrile, the method comprising absorbing gaseous acrylonitrile from a gas phase ammoxidation reaction into a solvent, the solvent including from about 0.1 to about 10,000 parts per million of a sulfonated carboxyl compound, recovering the acrylonitrile by distillation from the solvent and cooling and recycling a portion of the solvent. In the preferred method, the sulfonated carboxyl compound is selected from the group consisting of the sulfonated fatty acids which are derived from tall oils, fish oils, animal fats and synthetic oils.

Yet another method disclosed by the invention is a method for preparing ethylene, the method comprising cracking hydrocarbon feedstocks in a steam cracker to produce ethylene and, after cooling and compression, removing acid gases from the gaseous products by washing with caustic, the caustic containing from about 0.1 to about 10,000 parts per million of a sulfonated carboxyl compound recovering ethylene by a series of distillations. Preferably, the ethylene preparation method utilizes sulfonated carboxyl compounds selected from the group consisting of the sulfonated fatty acids which are derived from tall oils, fish oils, animal fats and synthetic oils.

In another embodiment, the invention comprises a method for preventing foulant deposition in petrochemical processes that produce water-insoluble foulant materials, the method comprising dispersing the water-insoluble foulant into an aqueous system, the aqueous system including from about 0.1 to 10,000 parts per million naphthalene sulfonate formaldehyde condensate. Preferably, the condensate is of a molecular weight from about 1000 to about 1 million daltons and are salts of sodium, potassium, calcium, ammonium hydroxide, and/or mixtures thereof. More preferably, the condensate is of a molecular weight from about 2500 to about 500,000 daltons. Most preferably, the condensate is of a molecular weight from about 3000 to about 10,000 daltons. In the preferred embodiment, the mixed sodium/potassium salts of naphthalene sulfonate formaldehyde condensate are included in the aqueous system in the concentration of from about 0.1 to about 1,000 parts per million.

Preferably, the aqueous system is chosen from among caustic, quench water, wash water, extraction solvent, hydrocarbon steam condensate and terephthalic acid dissolver. Where the aqueous system is an extraction solvent, the extraction solvent may be selected from a number of such solvents including acrylonitrile extraction solvent, butadiene extraction solvent, isoprene extraction solvent and aromatics extraction solvent. Alternatively, the extraction solvent may be selected from water, water/acetonitrile, 1-methyl-2-pyrrolidinone/water, dimethylformamide/2-furaldehyde/water, 3methoxypropionitrile/2-furaldehyde/water, glycols, and sulfolane.

In another embodiment of the invention a method for preparing acrylonitrile is disclosed, the method comprising absorbing gas acrylonitrile from a gas phase ammoxidation reaction into a solvent, the solvent including from about 0.1 to about 10,000 parts per million of a naphthalene sulfonate formaldehyde condensate, recovering the acrylonitrile by distillation from the solvent and cooling and recycling a portion of the solvent.

Preferably, the sulfonated carboxyl compound is of a molecular weight range of about 1000 to about 1 million and is the mixed sodium/potassium salt. More preferably, the condensate is of a molecular weight from about 2500 to about 500,000 daltons. Most preferably, the condensate is of a molecular weight from about 3000 to about 10,000 daltons.

Yet another embodiment of the invention comprises a method for preparing ethylene, the method comprising cracking hydrocarbon feedstocks in a steam cracker to produce ethylene and, after cooling and compression, removing acid gases from the gaseous products by washing with caustic, the caustic containing from about 0.1 to about 10,000 parts per million of a naphthalene sulfonate formaldehyde condensate and recovering ethylene by a series of distillations.

Preferably, the sulfonated carboxyl compound is of a molecular weight range of about 1000 to about 1 million and is the mixed sodium/potassium salt. More preferably, the condensate is of a molecular weight from about 2500 to about 500,000 daltons. Most preferably, the condensate is of a molecular weight from about 3000 to about 10,000 daltons.

The following examples are presented to describe preferred embodiments and utilities of the invention and are not meant to limit the invention unless otherwise stated in the claims appended hereto.

EXAMPLE 1

Sulfonates as Caustic Tower Dispersants

Gum dispersancy tests (GDT) were used to evaluate the efficacy of dispersants for this application. Normally this test makes use of a combination of a solvent for the foulant and a non-solvent which closely resembles the stream in which the foulant is to be dispersed. A concentrated solution of the foulant is made using the solvent. A small amount of this solution is then added to a large amount of the non-solvent; causing the foulant to precipitate. Addition of an effective dispersant to the non-solvent should delay the onset of precipitation. In testing dispersants for caustic systems, it has been found that the best method is to grow the polymer in the presence of dispersant which has been dissolved in the non-solvent (in this case caustic). The following example will illustrate this test.

Three graduated centrifuge test tubes were charged with 10 mL of a 10% aqueous solution of sodium hydroxide. Each tube was dosed with 1000 ppm of the appropriate sulfonate, and the tubes inverted 15 times to insure good mixing. Vinyl acetate was used as a latent form of acetaldehyde, and 250 µL of this ester was added to each tube. All three of the centrifuge tubes were stoppered and shaken vigorously until the tubes became warm to the touch. Ester hydrolysis is exothermic, and thus warm tubes were an indication that hydrolysis had taken place. Vinyl acetate hydrolysis products (in sodium hydroxide) are sodium acetate and vinyl alcohol which tautomerizes to acetaldehyde.

The centrifuge tubes were then allowed to stand undisturbed as polymerization occurred. The results of this testing showed that, in the Blank (or untreated sample), the polymer has separated from the caustic and has floated to the top of the tube. In the other tubes the polymer was still dispersed throughout the caustic liquid.

After standing for a longer time period, the Blank still showed the polymer floating at the top of the caustic. The tubes containing sulfonated oil and naphthelene sulfonate/formaldehyde copolymer showed signs of losing their dispersancy, while the lignosulfonate was still completely dispersing the polymer. The lignosulfonate appears to be effective over a longer period of time. However, the other sulfonated products are still effective dispersants for use in caustic systems.

EXAMPLE 2

Sulfonated Oleic Acid and Sulfates as Dispersants for Caustic Towers

These products were evaluated in the same manner as the sulfonated oils above. In this test, sulfonated and sulfated oleic acid were compared to sulfated castor oil, rapeseed oil and soybean oil. As above each centrifuge tube was charged with 9 mL of 10% sodium hydroxide and 1 mL of a 1% solution of each dispersant. This gave a 10 mL solution containing 1000 ppm of dispersant. Vinyl acetate was (250 µL) was added to each tube. The tubes were capped and shaken to initiate ester hydrolysis. The tubes were allowed to stand undisturbed for three hours. Visual examination showed that the untreated sample had polymer which had agglomerated. All of the other tubes were still dispersing the polymer. However, on closer examination it could be seen that the tube containing sulfonated oleic acid was not as effective as the other compounds. As seen above, the polymer which had agglomerated floated to the top of the centrifuge tube rendering quantification difficult.

EXAMPLE 3

Sulfonates as Dispersants for the Terephthalic Acid Purification Process

A gum dispersancy test (GDT) was used to evaluate efficacy of dispersants for this application. For this particular test, DMF was chosen as the solvent because it is a polar solvent which should dissolve phthalic acid and is itself soluble in water. The non-solvent for this test is typically the stream from which the deposit precipitates, in this instance water.

Results of the GDT conducted using deposited phthalic acid from a purified terephthalic acid unit showed that the untreated sample (Blank) had just over 3 volume percent precipitate. The sample treated with lignosulfonate showed almost no precipitate formed in the sample. The sulfonated oil was not quite as effective as the lignosulfonate, but did show a good deal of dispersancy in this test.

EXAMPLE 4

Sulfonates as Dispersants for Styrene Monomer Production

Since this polymer is absolutely insoluble in water, the solvent/non-solvent approach taken with the asphaltene dispersant test could not be taken. The polymer simply oils out and adheres to the side of the graduated centrifuge tube. Therefore, another approach was taken.

A sample of polymer of undetermined volume or weight was placed on an inside edge of a rectangular 8 ounce glass bottle. A 25 mL aliquot of process water was added to the bottle, and it was dosed with 1000 ppm of the sulfonated dispersant. The bottle was laid on its side in a shaker bath.

The bath was operated at low level for four hours. During this time the dispersant removed polymer from the side of the bottle and dispersed it in the water. Both sulfonated oil and lignosulfonates gave positive effects, however, the lignosulfonates were the more effective of the two sulfonated products.

EXAMPLE 5

Sulfonated Oleic Acid and Sulfates as Dispersants for Styrene Monomer Production A series of six eight ounce bottles were used for this experiment. In each bottle was placed an undetermined quantity of polymer. Aliquots (25 mL) of process water were added to each bottle which was then dosed with 1000 ppm of dispersant. The dispersants used were sulfonated oleic acid, sulfated oleic acid, sulfated castor oil, sulfated rapeseed oil, and sulfated soybean oil. As above the bottles were placed in a shaker bath which was operated at low level for four hours. In this experiment, the sulfonated oleic oil appears to have had the best effect (on a qualitative basis). In addition to solubilizing at least some of the polymer in water, this product was able to penetrate the deposit and remove it from the surface of the glass. Thus, this dispersant allows for better contact between the polymer and crude styrene.

This result is different from that obtained with the sulfated products and the lignosulfonate discussed in Example 4. In the above example, lignosulfonates remove polymer from the top for the deposit. Visual examination showed this phenomenon clearly. In the instant Example, it is also clear that sulfonated oleic acid worked by penetrating the deposit and lifting it from the surface of the glass.

EXAMPLE 6

Sulfonates as Dispersants for Acrylonitrile Recovery

A sample of stripper bottoms from an acrylonitrile unit was filtered by vacuum filtration to remove foulant from the stream. A small amount, about 2.5 grams, of foulant was dissolved in a dimethylformamide/isopropanol solution so that the concentration was about 5% foulant. To three tapered centrifuge tubes was added 10 ml of stripper bottoms. Aliquots of an aqueous solution of sulfonated fatty acid from tall oil, available from Climax Performance Materials Corp., were added to two of the tubes. The dosage of antifoulant in tubes 1, 2, and 3 was 0, 50 and 125 ppm, respectively. The tubes were shaken to blend the additives in the stripper bottoms. Then 0.5 ml of the foulant solution was added to each tube. The tubes were capped and shaken.

After 1 hour and 45 minutes, the foulants began to precipitate from tube number 1, (the Blank). No foulant was observed in tubes number 2 or 3. This demonstrates that the compound of the invention kept the foulant in solution, thus preventing the foulant from precipitating and fouling process equipment.

EXAMPLE 7

Sulfonated Oleic Acid as a Dispersant for Acrylonitrile Recovery

An experiment with six graduated centrifuge tubes were set up as previously described in Example 6. Each tube contained 10 mL of filtered acrylonitrile stripper bottoms and an aliquot of an aqueous solution of sulfonated oleic acid, available from Witco. Tubes 1–6 contained 0, 50, 100, 150, 200, and 250 ppm of the additive solution, respectively. To all of the tubes was then added 1 mL of a 1% DMF/isopropanol solution of foulant filtered from the stripper bottoms. After 30 minutes, solids began precipitating from the Blank (0 ppm). All of the other tubes were clear. After 60 minutes, 17 units of solids had settled to the bottom of the tube containing the blank solution. The 50 ppm solution contained 2 units of settled solids and all other tubes were clear.

After 120 minutes, the amount of settled solids in the 0, 50, and 100 ppm tubes was 11, 9, and 1.5 units, respectively. All other tubes were clear.

After 270 minutes, the amount of settled solids in the 0, 50, 100, and 150 ppm tubes was 10, 10, 5.5, and 2.0 units, respectively. All other tubes were clear.

After 20.5 hours, the amount of settled solids in the 0, 50, 100, 150, and 200 ppm tubes was 9, 8, 3.5, 2.5, and 1.5 units, respectively. The 250 ppm tube was clear.

This example illustrates that sulfonated oleic acid is effective at dispersing foulant in acrylonitrile bottoms.

EXAMPLE 8

Sulfates as a Dispersants for Acrylonitrile Recovery

An experiment with five graduated centrifuge tubes was set up as previously described in Example 6. Each tube contained 10 mL of filtered acrylonitrile stripper bottoms and 100 ppm of one of the following: a sulfated castor oil, a sulfated oleic acid, a sulfated rapeseed oil, a sulfated soybean oil, all available from Climax Performance Materials, Corp.

To all of the tubes was then added 1 mL of a 1% DMF/isopropanol solution of foulant filtered from the stripper bottoms.

After 60 minutes, 8 units of solids had settled to the bottom of the tube containing the blank solution. All other tubes were clear. After 150 minutes, the amount of settled solids in the blank was 5.5 units. The tube containing the sulfated oleic acid contained 0.75 units of settled solids. The other three samples remained clear.

This example illustrates that sulfated oils from various sources are also effective as dispersants in the acrylonitrile recovery process. Also, the previous example had shown that sulfonated oleic acid is effective at dispersing foulant in acrylonitrile bottoms. The present example illustrates that the corresponding sulfated material is also effective.

EXAMPLE 9

Naphthalene Sulfonate Formaldehyde Condensates as a Dispersants for Acrylonitrile Recovery An experiment with five graduated centrifuge tubes was set up as previously described in Example 6. Each tube contained 10 mL of filtered acrylonitrile stripper bottoms and an aliquot of an aqueous mixture of the sodium and potassium salts of naphthalene sulfonate formaldehyde condensate, available from Hampshire. Tubes 1–4 contained 0, 50, 100, and 250 ppm of the additive solution, respectively. To a fifth tube was added 250 ppm of an aqueous solution of sulfonated oleic acid. To all of the tubes was then added 0.75 mL of a 1% DMF/isopropanol solution of foulant filtered from the stripper bottoms.

After 30 minutes, solids began precipitating from the Blank (0 ppm). All of the other tubes were clear. After 72 hours, solids had precipitated from all of the samples except for the one containing 250 ppm of the naphthalene sulfonate formaldehyde condensate. Approximately 3 mL of solids had precipitated from the blank sample and from the sample containing sulfonated oleic acid. The two samples containing 50 and 100 ppm of the naphthalene sulfonate formaldehyde condensate contained about 1 mL of precipitated solids.

Changes can be made in the composition, operation and arrangement of the method of the present invention described herein without departing from the concept and scope of the invention as defined in the following claims:

We claim:

1. A method for preventing foulant deposition in an aqueous stream of acrylonitrile stripper bottoms containing organic material produce water-insoluble foulant materials which cause fouling on surfaces of heat exchangers used in the production of acrylonitrile, the method comprising dispersing the water-insoluble foulant into said aqueous stream by addition of from about 0.1 to 10,000 parts per million naphthalene sulfonate formaldehyde condensate having a molecular weight of from about 3000 to about 1 million daltons, to prevent said fouling deposition on the surfaces of said heat exchangers.

2. The method of claim 1 wherein the condensate is a salt of sodium, potassium, calcium, ammonium hydroxide, and/or mixtures thereof.

3. The method of claim 1 wherein the mixed sodium/potassium salts of naphthalene sulfonate formaldehyde condensate are added to the aqueous stream in the concentration of from about 0.1 to about 1,000 parts per million.

* * * * *